(12) United States Patent
Ekberg (10) Patent No.: US 7,826,872 B2
(45) Date of Patent: Nov. 2, 2010

(54) AUDIO NICKNAME TAG ASSOCIATED WITH PTT USER

(75) Inventor: Viktoria Ekberg, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 730 days.

(21) Appl. No.: 11/680,232

(22) Filed: Feb. 28, 2007

(65) Prior Publication Data

US 2008/0207242 A1 Aug. 28, 2008

(51) Int. Cl.
*H04B 1/38* (2006.01)
*H04B 7/00* (2006.01)
*H04W 4/00* (2009.01)

(52) U.S. Cl. .............. 455/567; 455/517; 455/519; 455/566

(58) Field of Classification Search .......... 455/517, 455/518, 519, 520, 521, 416, 567
See application file for complete search history.

(56) References Cited

U.S. PATENT DOCUMENTS

| | | | | |
|---|---|---|---|---|
| 6,055,497 A * | 4/2000 | Hallkvist et al. | ............ | 704/228 |
| 6,366,771 B1 * | 4/2002 | Angle et al. | ............ | 455/414.1 |
| 6,424,830 B1 * | 7/2002 | O'Hagan et al. | ......... | 455/422.1 |
| 7,065,344 B2 * | 6/2006 | O'Hagan et al. | ......... | 455/414.1 |
| 7,310,513 B2 * | 12/2007 | Bulthuis et al. | .......... | 455/412.1 |
| 2002/0052185 A1 * | 5/2002 | O'Hagan et al. | ............. | 455/90 |
| 2006/0019689 A1 | 1/2006 | Pantalone et al. | | |
| 2006/0073843 A1 | 4/2006 | Aerrabotu et al. | | |
| 2006/0121926 A1 * | 6/2006 | Joung | ........................ | 455/518 |
| 2006/0159238 A1 * | 7/2006 | Akita et al. | ................ | 379/67.1 |
| 2006/0183513 A1 * | 8/2006 | Slamka et al. | ........... | 455/575.1 |

OTHER PUBLICATIONS

International Search Report and Written Opinion dated Mar. 27, 2008 issued in corresponding PCT application No. PCT/IB2007/053361, 14 pages.
Akshai Parthasarathy: "Push to Talk over Cellular (PoC) Server". Dec. 2004. Proceedings of the 2005 IEEE International Conference on Networking, Sensing and Control. pp. 772-776.
International Preliminary Report on Patentability for corresponding PCT Application No. PCT/IB2007/053361 dated Jul. 10, 2009, 13 pages.
Benyassine, A. et al., "ITU-T Recommendation G.729 Annex B: A Silence Compression Scheme for Use with G.729 Optimized for V.70 Digital Simultaneous Voice and Data Applications", IEEE Communications Magazine, IEEE Service Center, Piscataway, NJ, U.S., vol. 35, No. 9, Sep. 1, 1997, pp. 64-73, XP000704425 ISSN: 0163-6804.

* cited by examiner

*Primary Examiner*—Tilahun Gesesse
(74) *Attorney, Agent, or Firm*—Harrity & Harrity, LLP (57) ABSTRACT

A system receives an audio nickname tag related to a push-to-talk (PTT) user, and associates the audio nickname tag with the PTT user.

20 Claims, 11 Drawing Sheets

| PTT USER | PHONE NO. | USER GROUPS | OTHER INFO. | AUDIO NICKNAME TAG | |
|---|---|---|---|---|---|
| John | (888) 888-8888 | Paul's Friend | Picture | 🔊 | John's Audio File |
| Paul | (999) 999-9999 | Glenn's Employee | Ring Tone | 🔊 | Paul's Audio File |
| Glenn | (222) 222-2222 | John's Card Team | None | 🔊 | Glenn's Audio File |

FIG. 11

AUDIO NICKNAME TAG ASSOCIATED WITH PTT USER

BACKGROUND

A push-to-talk (PTT) service provides direct one-to-one and/or one-to-many audio communication. PTT may provide a mechanism for instantaneous communication commonly employed in wireless cellular telephone services that uses a button to place a device in a voice transmission mode. The operation of phones this way may be similar to "walkie talkie" use. A PTT service may switch a phone from full duplex mode, where both parties may hear each other simultaneously, to half duplex mode, where a single party may speak at one time. Multiple parties to the conversation may also be included. The availability of the parties may be checked before the call with the help of a presence function.

During a PTT group or chat session, it is difficult to determine who has entered or exited the session. Typically, the parties to a chat session may be displayed as a list of names on a user device (e.g., a cell phone). For example, a beep may be generated if a party enters the chat session, but such a beep does not provide any information about the entering party. Thus, in order to determine entering parties to the chat session, a user may need to constantly check the list of names on the user device, which may be time consuming and inconvenient. It is also difficult to determine who has the floor (i.e., a person who is currently speaking, while the other users are listening) during a chat session without constantly checking the display of the user device.

SUMMARY

According to one aspect, a method may include receiving an audio nickname tag related to a push-to-talk (PTT) user, and associating the audio nickname tag with the PTT user.

Additionally, the method may include providing the audio nickname tag to a user device if the PTT user calls the user device.

Additionally, the method may include providing the audio nickname tag to a user device if the PTT user one of enters or exits a PTT group or chat session.

Additionally, the method may include providing the audio nickname tag to a user device if the PTT user speaks during a PTT group or chat session.

Additionally, the method may include providing the audio nickname tag to a user device to indicate that the PTT user has the floor in one of a PTT group or chat session.

According to another aspect, a method may include creating an audio nickname tag related to a push-to-talk (PTT) user, and providing the audio nickname tag to a database for association with the PTT user.

Additionally, creating an audio nickname tag may include receiving an audio input from the PTT user, and storing the audio input as the audio nickname tag.

Additionally, creating an audio nickname tag may include receiving a text input from the PTT user, converting the text input into an audio input, and storing the audio input as the audio nickname tag.

According to yet another aspect, a device may include a memory to store a plurality of instructions, and a processor to execute instructions in the memory to receive an audio nickname tag related to a push-to-talk (PTT) user, associate the audio nickname tag with the PTT user, and store the audio nickname tag.

Additionally, the processor may provide the audio nickname tag to a user device if the PTT user calls the user device.

Additionally, the processor may provide the audio nickname tag to a user device if the PTT user one of enters or exits a PTT group or chat session.

Additionally, the processor may provide the audio nickname tag to a user device if the PTT user speaks during a PTT group or chat session.

Additionally, the processor may provide the audio nickname tag to a user device to indicate that the PTT user has the floor in one of a PTT group or chat session.

Additionally, the memory may include a PTT information database that includes a plurality of PTT user identifiers and a plurality of audio nickname tags associated with the plurality of PTT user identifiers.

Additionally, the audio nickname tag may include at least one of an audio file, streaming audio, a combination of audio files, or one or more audio files with embedded links to other files.

Additionally, the audio nickname tag may provide a unique audible identifier for the associated PTT user.

According to a further aspect, a device may include a memory to store a plurality of instructions, and processing logic to execute instructions in the memory to create an audio nickname tag related to a push-to-talk (PTT) user, and provide the audio nickname tag to a database for association with the PTT user.

Additionally, the processing may receive an audio input from the PTT user, and store the audio input as the audio nickname tag.

Additionally, the processing may receive a text input from the PTT user, convert the text input into an audio input, and store the audio input as the audio nickname tag.

According to another aspect, a device may include a memory to store a plurality of instructions, and processing logic to execute instructions in the memory to receive an audio nickname tag related to a user, associate the audio nickname tag with contact information related to the user, and play the audio nickname tag if the user communicates with the device via a communication mechanism associated with the contact information.

Additionally, the audio nickname tag may include at least one of an audio file, streaming audio, a combination of audio files, or one or more audio files with embedded links to other files.

Additionally, the processing logic may play the audio nickname tag if the user communicates with the device via one of a telephone call, a text message, an instant message, or an email.

According to a further aspect, a system may include means for receiving an audio nickname tag related to a push-to-talk (PTT) user, means for associating the audio nickname tag with the PTT user, and means for providing the audio nickname tag if the PTT user performs a PTT function.

Additionally, the PTT function may include at least one of the PTT user generating a PTT call, the PTT user entering or exiting a PTT group or chat session, or the PTT user speaking during the PTT group or chat session.

According to still another aspect, a system may include means for creating an audio nickname tag related to a push-to-talk (PTT) user, and means for providing the audio nickname tag to a database for association with the PTT user.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Implementations described herein may provide an audio nickname tag for a user of a push-to-talk (PTT) user device. For example, in one implementation, the user device may correspond to a cellular or mobile telephone capable of supporting PTT functionality. The user device may permit the PTT user to record one or more audio nickname tags and/or to associate other PTT users with audio nickname tags. In one example, the audio nickname tags may be used to inform parties in a PTT group session or chat session when a user(s) associated with the audio nickname tags enters and/or exits the session. In another example, the audio nickname tags may be used to identify a PTT user who has the floor (i.e., a user who is capable of speaking rather than listening) during a PTT group or chat session. This may make it easier for parties in the PTT group or chat session to identify who is going to speak before the PTT user with the floor actually speaks, and may ensure the PTT user with the floor that he/she actually has the floor. In still other examples, the audio nickname tags may be used to identify a user sending instant messages, text messages, and/or emails to another user, and/or calling another user.

An "audio nickname tag," as the term is used herein, is to be broadly interpreted to include any machine-readable and machine-storable audio work product. An audio nickname tag may include, for example, an audio file, streaming audio, a combination of audio files, one or more audio files with embedded links to other files, etc. An audio file may include a variety of audio file formats, including uncompressed formats (e.g., Waveform (WAV) audio format, Audio Interchange File Format (AIFF), and AU file format), formats with lossless compression (e.g., Free Lossless Audio Codec (FLAC), Monkey's Audio (APE), WavPack, Shorten, True Audio (TTA), Apple lossless, and lossless Windows Media Audio (WMA)), and/or formats with lossy compression (e.g., Moving Picture Experts Group-1 Audio Layer 3 (MP3), Vorbis, lossy WMA, and Advanced Audio Coding (AAC)).

Exemplary Network Configuration

Figure 1:
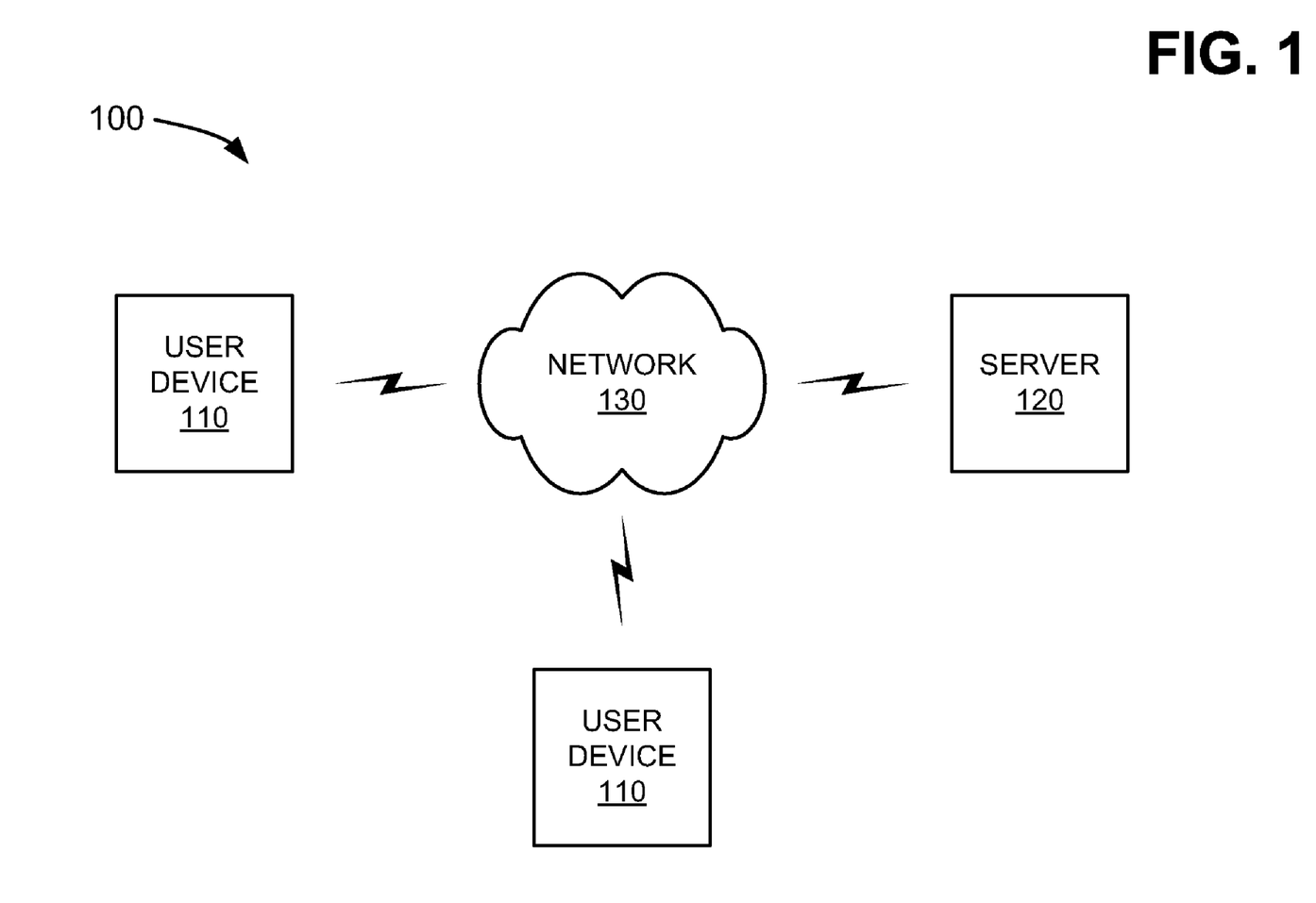
FIG. 1 is an exemplary diagram of a network in which systems and methods described herein may be implemented.

FIG. 1 is an exemplary diagram of a network 100 in which systems and methods described herein may be implemented. Network 100 may include one or more user devices 110, and a server 120 connected via a network 130. Two user devices 110 and one server 120 have been illustrated as connected to network 130 for simplicity. In practice, there may be more user devices and/or servers. Also, in some instances, a user device may perform one or more functions of a server and a server may perform one or more functions of a user device.

User device 110 may include one or more entities. An entity may be defined as a device, such as a telephone, a cellular phone, a personal computer, a personal digital assistant (PDA), a laptop, or another type of computation or communication device, a thread or process running on one of these devices, and/or an object executable by one of these devices. In one implementation, user device 110 may provide push-to-talk (PTT) applications and/or audio nickname tags in a manner described herein.

Server 120 may include one or more server entities that gather, process, search, and/or provide information in a manner described herein. For example, in one implementation, server 120 may provide functions such as user authentication, call routing, and/or generic charging based on the Session Initiation Protocol (SIP) in a manner described herein. In another implementation, server 120 may provide application specific tasks such as floor control (i.e., the reservation of talk spurts for one speaker at a time), may provide interfaces to provisioning and network management systems, and/or may create application-specific charging detail records (CDRs). In still another implementation, server 120 may provide a PTT information database containing PTT users and their service profiles, user group information, audio nickname tags associated with PTT users, and/or other PTT user-related information. In a further implementation, server 120 may correspond to a shared group and list management server containing pre-defined groups that may be shared by other Internet Protocol (IP) Multimedia Subsystem (IMS)-based applications, such as games and/or presence applications. In yet another implementation, server 120 may correspond to a presence server that may provide presence information (e.g., whether a PTT user is available or unavailable).

Network 130 may include a local area network (LAN), a wide area network (WAN), a metropolitan area network (MAN), a telephone network, such as the Public Switched Telephone Network (PSTN) or a cellular telephone network, an intranet, the Internet, or a combination of networks. User device 110 and server 120 may connect to network 130 via wired and/or wireless connections. In exemplary implementations, network 130 may correspond to an IP-capable network supporting half-duplex Voice over IP (VoIP) technology, an Integrated Digital Enhanced Network (iDEN), a Global System for Mobile Communications (GSM) network capable of supporting PTT technology, a Wideband Code Division Multiple Access (WCDMA) network capable of supporting PTT technology, 2.5G or 3G packet-switched networks using a form of VoIP based upon SIP and Real-Time Transport Protocol (RTP) protocols capable of supporting PTT technology (also referred to as "Push To Talk over Cellular (PoC)"), etc.

In an exemplary operation, network 100 may provide PTT services and/or applications for user devices 110. The principle of communication behind PTT services and/or applications may include pushing a PTT key (e.g., a control button on user device 110) to talk. Users may select another user or a user group they wish to contact (e.g., from their phone books or contact information), and may press the PTT key to start talking. Call connection from one user device 110 to another user device 110 (e.g., via server 120) may be almost instantaneous. Each PTT user may be able to see other user's presence status prior to initiating a PTT conversation.

PTT calls may be a one-way communication, i.e., while one user speaks, the other user(s) listen. The opportunity to speak may be granted by pressing the PTT key of user device 110 on a first come, first served basis. PTT calls may be connected without the recipients answering, and may be received through an audio component (e.g., a speaker) of user device 110. Alternatively, a PTT user may choose to receive PTT calls after accepting an invitation, and may listen to PTT calls through an earphone or headset connected to user device 110.

In PTT group communication, a user (via user device 110) may invite a group of users to participate in a group session. The invited users may receive an indication of the incoming session (e.g., via user devices 110 associated with invited users), and may join in the session using either automatic or manual answer. The invited group may be a predefined group of users or a list of users selected from a buddy or contact list as a temporary arrangement. In the latter case, the ability to see other users' availability, or presence status, before making the dial-out call may help to ensure contact with a selected user(s). In join-in group communication, the participants may explicitly join a group session for communication. In this way, users may have full control over which groups they participate. A join-in group session may not prevent a user from receiving other calls or from participating in other group join-in sessions simultaneously (e.g., multi-session support). A join-in group may be an open group without access control (e.g., families, hobby groups, etc.) or a closed group with a list of members (e.g., business users).

A PTT service and/or application may be based on multi-unicasting, where each sending user device 110 may send datagram (e.g. any type or form of data, such as packet or non-packet data) traffic to a PTT server (e.g., server 120) and, in the case of a group call, server 120 may duplicate the traffic to all recipient user devices 110. For example, if a sales manager wanted to convey sales information to his/her three member sales team, the sales manager may convey such information using his/her user device 110 and a PTT application provided thereon. The sales manager may select the sales team with his/her user device 110, may press the PTT key on his/her user device 110, and may speak the sales information. The spoken sales information may be provided to server 120, via network 130, and server 120 may create three copies of the spoken sales information, and may disseminate the copies to the sales team user devices 110 (e.g., the first team member may receive the information on a personal computer, the second team member may receive the information on a PDA, and the third team member may receive the information on a mobile phone).

Although FIG. 1 shows exemplary components of network 100, in other implementations, network 100 may contain fewer, different, or additional components than depicted in FIG. 1.

Exemplary User Device Configuration

Figure 2:
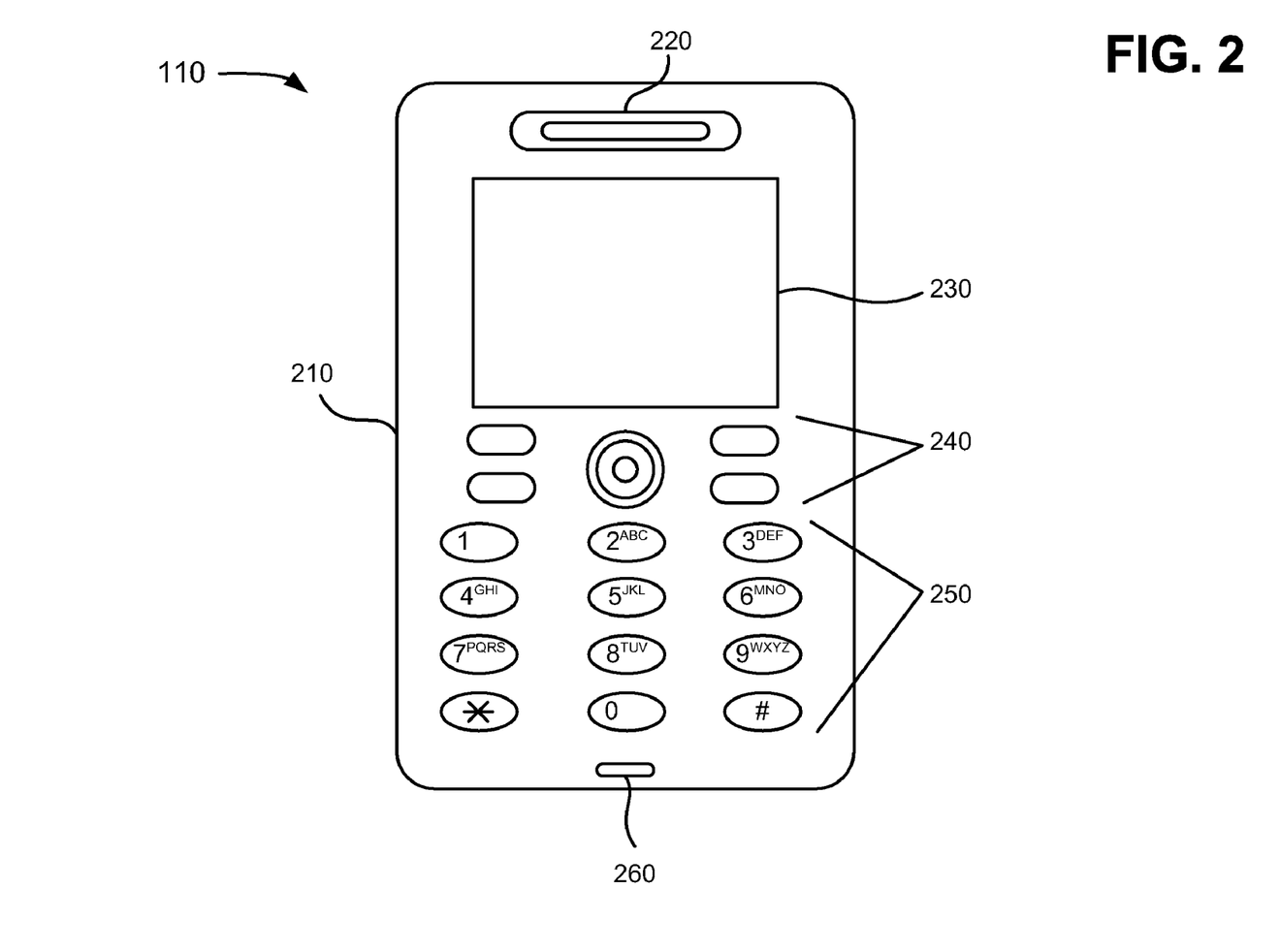
FIG. 2 is an exemplary front view of the user device of FIG. 1.

FIG. 2 is an exemplary front view of user device 110 in one implementation described herein. As shown in FIG. 2, user device 110 may include a housing 210, a speaker 220, a display 230, control buttons 240, a keypad 250, and/or a microphone 260. Housing 210 may protect the components of user device 110 from outside elements. Speaker 220 may provide audible information to a user of user device 110.

Display 230 may provide visual information to the user. For example, display 230 may display text input into user device 110, text and/or graphics received from another device, such as server 120, and/or information regarding incoming or outgoing calls or text messages, emails, media, games, phone books, address books, the current time, etc. Control buttons 240 may permit the user to interact with user device 110 to cause user device 110 to perform one or more operations. For example, control buttons 240 may be used to cause user device 110 to transmit information. Keypad 250 may include a standard telephone keypad. Microphone 260 may receive audible information from the user.

Although FIG. 2 shows exemplary elements of user device 110, in other implementations, user device 110 may contain fewer, different, or additional elements than depicted in FIG. 2. In still other implementations, one or more elements of user device 110 may perform the tasks performed by one or more other elements of user device 110.

Figure 3:
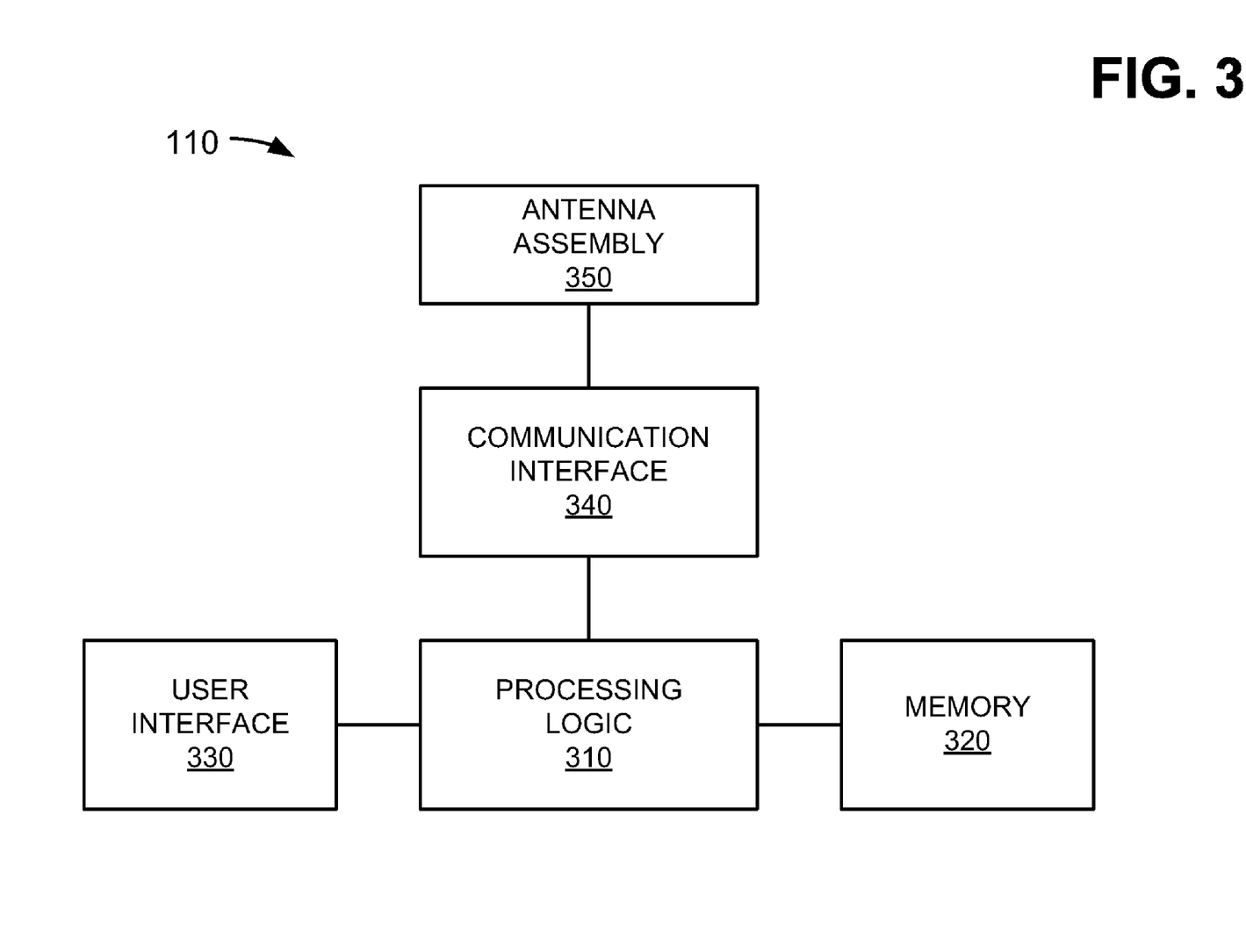
FIG. 3 is a diagram of exemplary components of the user device of FIGS. 1 and 2.

FIG. 3 is a diagram of exemplary components of user device 110. As shown in FIG. 3, user device 110 may include processing logic 310, memory 320, a user interface 330, a communication interface 340, and/or an antenna assembly 350. Processing logic 310 may include a processor, microprocessor, an application specific integrated circuit (ASIC), field programmable gate array (FPGA), or the like. Processing logic 310 may control operation of user device 110 and its components. Memory 320 may include a random access memory (RAM), a read only memory (ROM), and/or another type of memory to store data and instructions that may be used by processing logic 310.

User interface 330 may include mechanisms for inputting information to user device 110 and/or for outputting information from user device 110. Examples of input and output mechanisms might include buttons (e.g., control buttons 240, keys of keypad 250, a joystick, etc.) to permit data and control commands to be input into user device 110; a speaker (e.g., speaker 220) to receive electrical signals and output audio signals; a microphone (e.g., microphone 260) to receive audio signals and output electrical signals; a display (e.g., display 230) to output visual information (e.g., text input into user device 110); and/or a vibrator to cause user device 110 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals. Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340. In one implementation, for example, communication interface 340 may communicate with a network, such as network 130.

As will be described in detail below, user device 110 may perform certain operations in response to processing logic 310 executing software instructions of an application contained in a computer-readable medium, such as memory 320. A computer-readable medium may be defined as a physical or logical memory device and/or carrier wave. The software instructions may be read into memory 320 from another computer-readable medium or from another device via communication interface 340. The software instructions contained in memory 320 may cause processing logic 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of user device 110, in other implementations, user device 110 may contain fewer, different, or additional components than depicted in FIG. 3. In still other implementations, one or more components of user device 110 may perform the tasks performed by one or more other components of user device 110.

Exemplary Server Configuration

Figure 4:
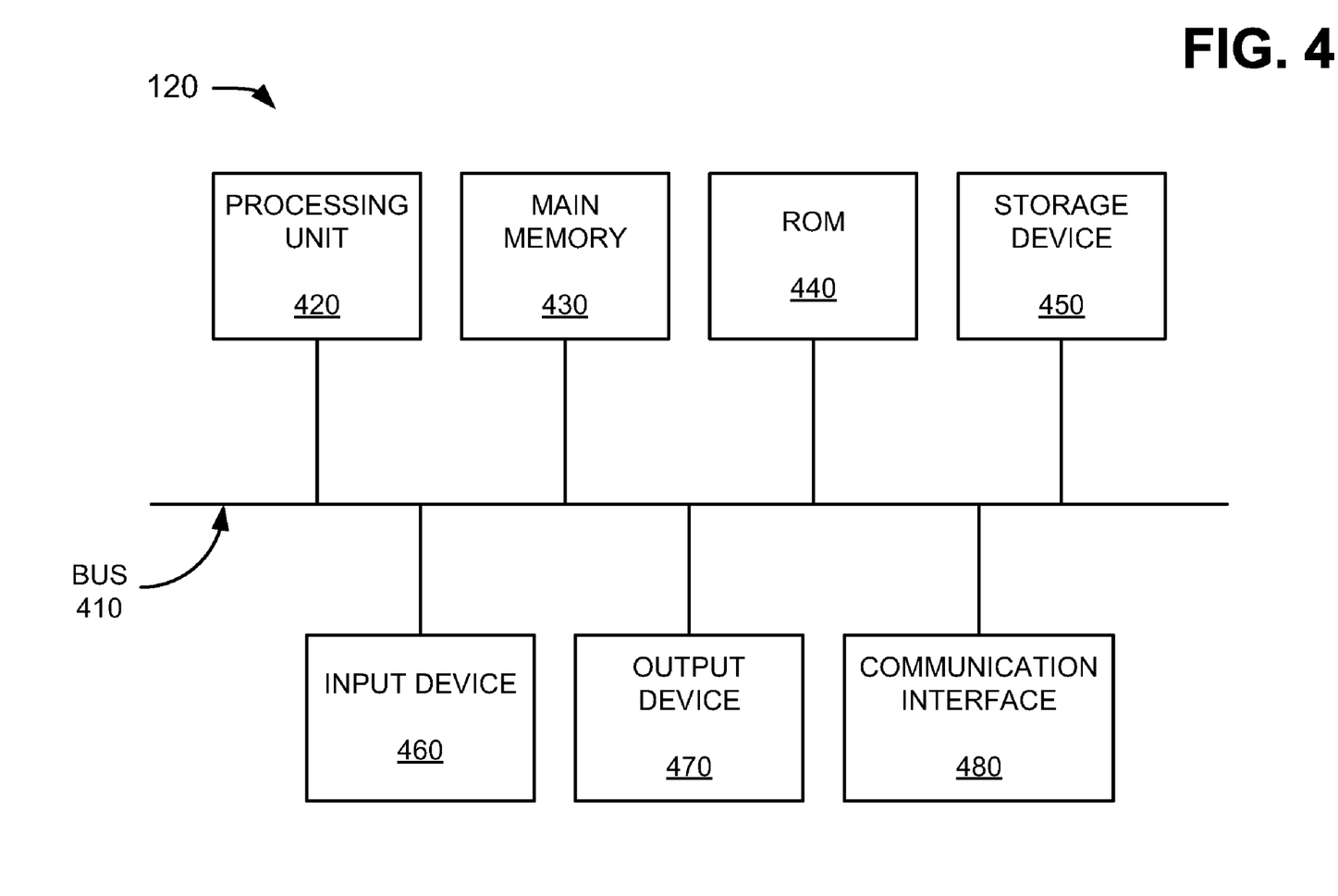
FIG. 4 is an exemplary diagram of the server of FIG. 1.

FIG. 4 is an exemplary diagram of server 120. As illustrated, server 120 may include a bus 410, a processing unit 420, a main memory 430, a ROM 440, a storage device 450, an input device 460, an output device 470, and/or a communication interface 480. Bus 410 may include a path that permits communication among the components of server 120.

Processing unit 420 may include a processor, microprocessor, or other type of processing logic that may interpret and execute instructions. Main memory 430 may include a RAM or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to server 120, such as a keyboard, a mouse, a pen, a microphone, voice recognition and/or biometric mechanisms, etc. Output device 470 may include a mechanism that outputs information to the operator, including a display, a printer, a speaker, etc. Communication interface 480 may include any transceiver-like mechanism that enables server 120 to communicate with other devices and/or systems. For example, communication interface 480 may include mechanisms for communicating with another device or system via a network, such as network 130.

As will be described in detail below, server 120 may perform certain operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of server 120, in other implementations, server 120 may contain fewer, different, or additional components than depicted in FIG. 4. In still other implementations, one or more components of server 120 may perform the tasks performed by one or more other components of server 120.

Exemplary Creation of Audio Nickname Tag

Figure 5:
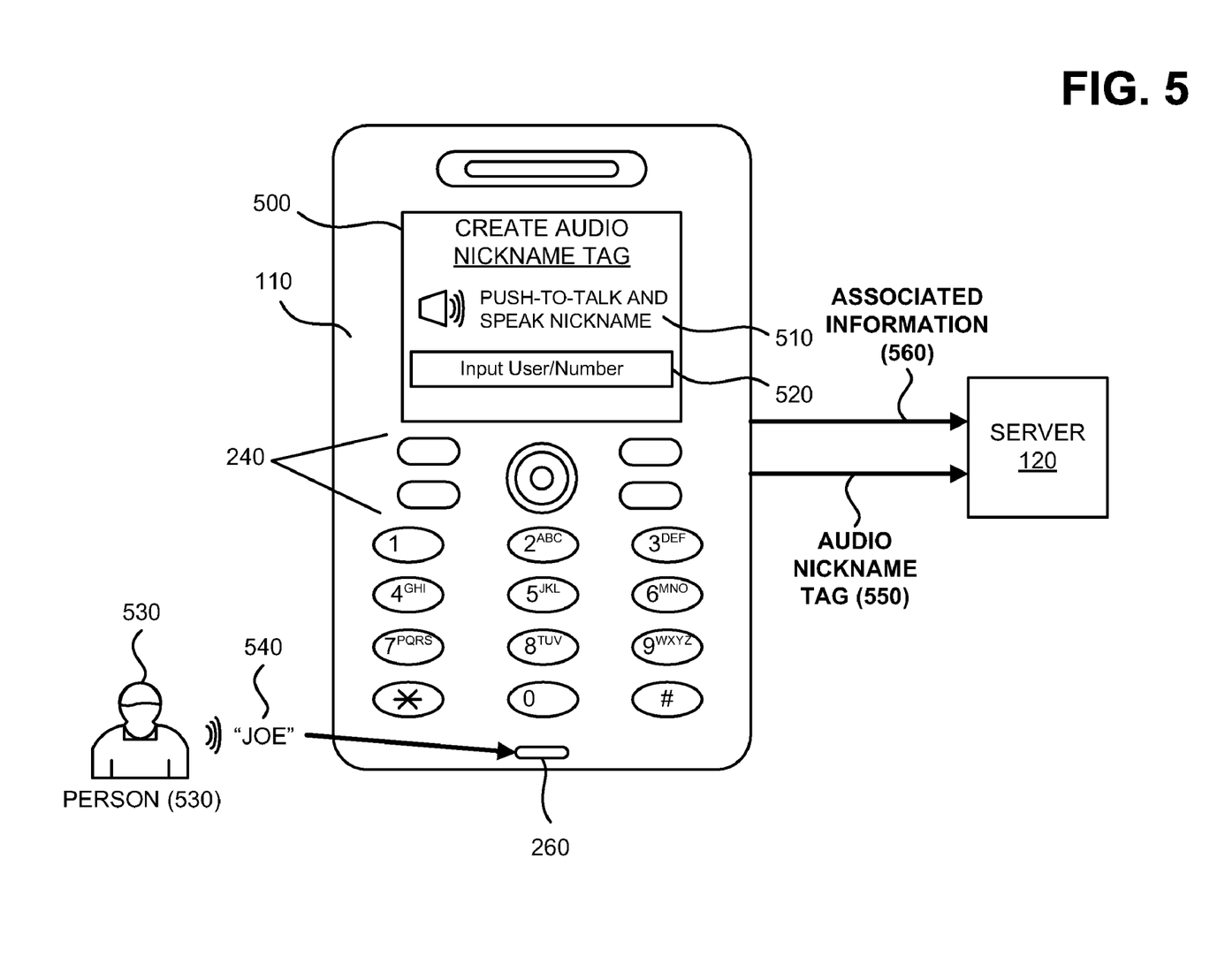
FIG. 5 is a diagram of exemplary interactions between the user device and the server of FIG. 1 during creation of an audio nickname tag.

FIG. 5 is a diagram of exemplary interactions between user device 110 and server 120 during creation of an audio nickname tag. As shown, user device 110 may provide a display 500 (e.g., via display 230) for creating an audio nickname tag for a user. Display 500 may include instructions 510 for creating an audio nickname tag (e.g., "Push-to-talk and speak nickname"), and a mechanism 520 for inputting user information and/or other information (e.g., a telephone number associated with the user). Mechanism 520 may include, for example, an input field, a drop-down menu (e.g., providing telephone number choices), and/or other similar input mechanisms. For example, if a person 530 wishes to input his/her name or other information as the audio nickname tag, person 530 may select a PTT key of user device 110 (e.g., one of control buttons 240), and may speak a name 540 (e.g., "Joe") into microphone 260 of user device 110. Person 530 may also input user information and/or other information to associate with the audio nickname tag using mechanism 520. User device 110 may provide a created audio nickname tag and/or its associated information to server 120 (e.g., via network 130, not shown) as indicated by reference numbers 550 and 560, respectively. Server 120 may store audio nickname tag 550 and/or its associated information 560 in a database, as described in detail below.

Although FIG. 5 shows inputting name 540 as audio nickname tag 550, in other implementations, person 530 may input any type of information as audio nickname tag 550 that may be associated with user information and/or other information 560. In other implementations, person 530 may create one or more audio nickname tags for himself/herself, or may create one or more audio nickname tags for each contact contained in user device 110 (e.g., contacts provided in a contact list, address book, phone book, etc. of user device 110). In still other implementations, person 530 need not verbally provide audio nickname tag 550 to user device 110, but rather person 530 may type audio nickname tag 550 (e.g., via keypad 250) and user device 110 may convert the typed text into an audio format. Alternatively and/or additionally, user device 110 may present person 530 with pre-created audio nickname tags (e.g., a list of common names of people), and person 530 may select one or more of the pre-created audio nickname tags. In other implementations, user device 110 may permit person 530 to upload one or more audio files as audio nickname tags.

Furthermore, in one implementation, a first user device 110 may receive one or more audio nickname tags from a second user device 110 (e.g., a text message, an email, an instant message, etc.). The first user device 110 may associate one or more of the received audio nickname tags with contact information related to a user of the second user device 110. If the first user device 110 associates the audio nickname tags with the user of second user device 110, the first user device 110 may use one or more of the audio nickname tags the next time the second user device 110 attempts to contact user device 110 (e.g., via a call, a text message, an instant message, an email, etc.). For example, if John's user device calls user device 110 after providing his audio nickname tag, user device 110 may play John's audio nickname tag and indicate that a call is being received (e.g., user device 110, via speaker 220, may announce that "John is calling"). In another example, user device 110 may play John's audio nickname tag if John's user device attempts to contact (e.g., via email, instant message, call, text message, etc.) user device 110.

Although FIG. 5 shows exemplary display 500 of user device 110, in other implementations, user device 110 may provide fewer, different, or additional displays than depicted in FIG. 5. In still other implementations, exemplary display 500 of FIG. 5 may include fewer, different, or additional elements than depicted in FIG. 5.

Exemplary User Device Displays

Figure 6:
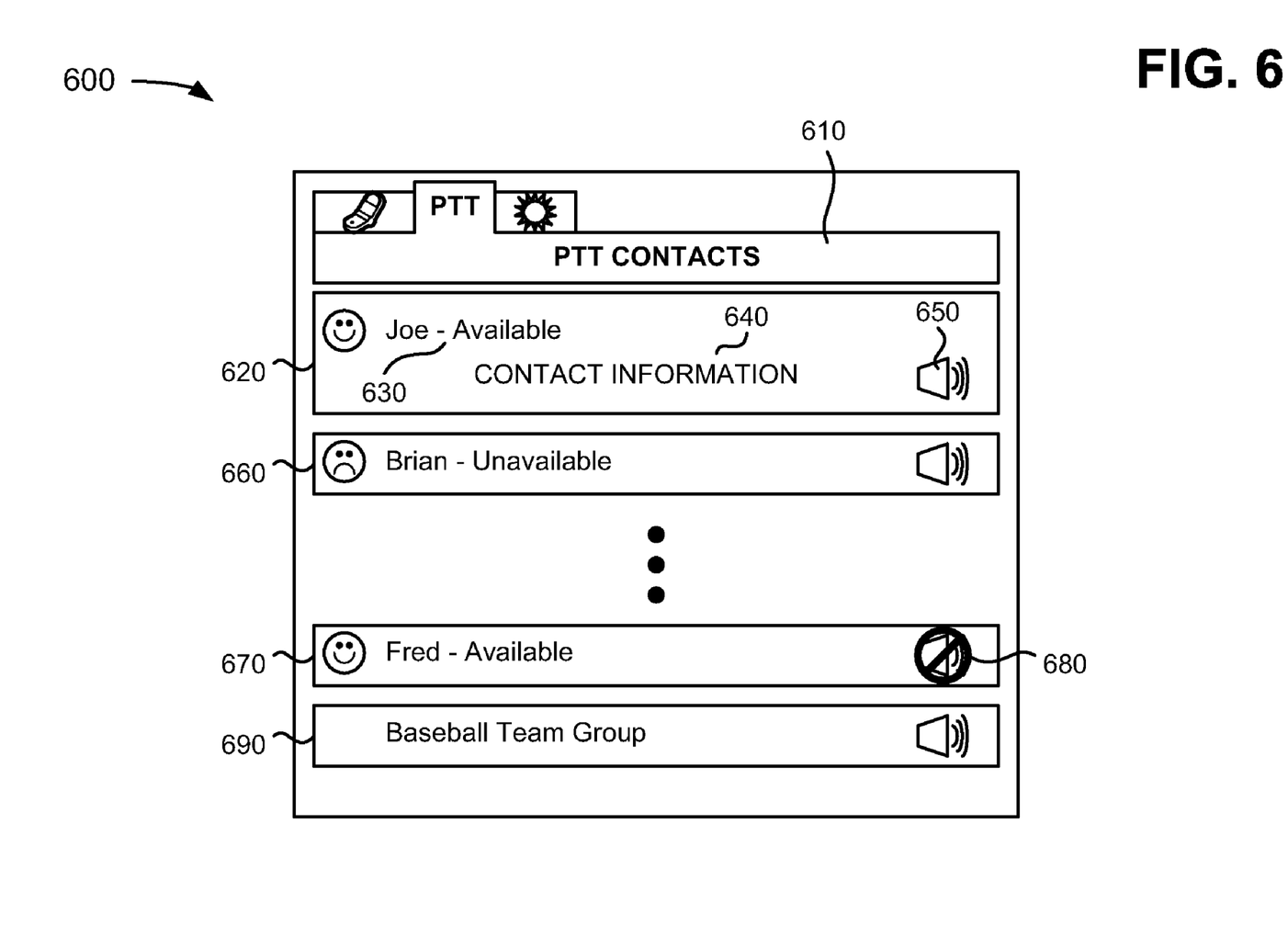
FIG. 6 is a diagram of an exemplary display of PTT contacts that may be provided by the user device of FIG. 1.

FIG. 6 is a diagram of an exemplary display 600 of PTT contacts 610 that may be provided by user device 110 (e.g., via display 230). As shown, PTT contacts 610 may include a variety of information about the PTT contacts related to user device 110. Such information may be stored locally in user device 110 (e.g., in memory 320) and/or may be stored in a database provided in server 120 (e.g., in storage device 450). A first PTT contact 620 (e.g., Joe) may provide information 630 about the availability or presence of first PTT contact 620 (e.g., Joe may be available), contact information 640 related to first PTT contact 620 (e.g., an address, a telephone number, a profile, etc.), and an audio nickname tag 650 associated with first PTT contact 620). A user may select audio nickname tag 650 (e.g., by hovering over or clicking on audio nickname tag 650), and user device 110 may play the audio associated with audio nickname tag 650.

As further shown in FIG. 6, PTT contacts 610 may include a second PTT contact 660 (e.g., Brian) who may be unavailable, but may have an associated audio nickname tag, and a third PTT contact 670 (e.g., Fred) who may be available, but may not have an associated nickname tag, as indicated by reference number 680. PTT contacts 610 may display user-created groups of PTT contacts, such as a baseball team group 690, and any additional information associated with the user-created groups. A user of user device 110 may use PTT contacts 610 to determine whether a PTT call may be placed with a particular contact or group of contacts. For example, a user may initiate a PTT call with first PTT contact 620 (e.g., Joe) and third PTT contact 670 (e.g., Fred) because Joe and Fred may be available. Although not shown in FIG. 6, a user may select baseball team group 690 to determine the availabilities of the members of this group and/or to initiate a PTT call to the group (or available member(s) of the group).

Although FIG. 6 shows an exemplary display of user device 110, in other implementations, user device 110 may provide fewer, different, or additional displays than depicted in FIG. 6. In still other implementations, the exemplary display of FIG. 6 may include fewer, different, or additional elements than depicted in FIG. 6.

Figure 7:
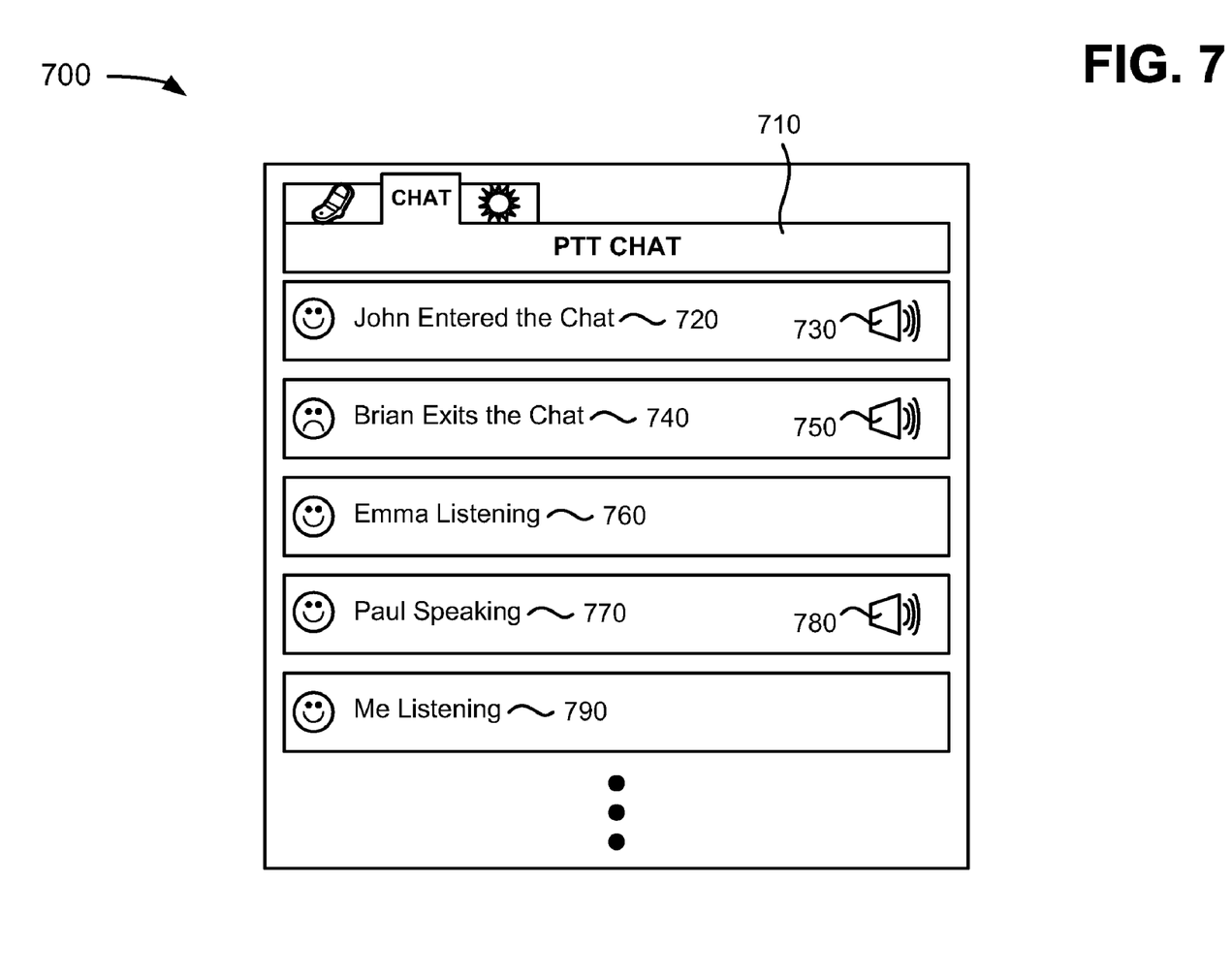
FIG. 7 is a diagram of an exemplary display of a PTT chat session that may be provided by the user device of FIG. 1.

FIG. 7 is a diagram of an exemplary display 700 of a PTT chat session 710 that may be provided by user device 110 (e.g., via display 230). As shown, PTT chat session 710 may include a variety of information about the PTT contacts related to PTT chat session 710. Such information may be stored locally in user device 110 (e.g., in memory 320) and/or may be stored in a database provided in server 120 (e.g., in storage device 450). User device 110 and/or server 120 may also manage one or more functions of PTT chat session 710. For example, a first PTT contact 720 (e.g., John) may enter PTT chat session 710, and an audio nickname tag 730 associated with first PTT contact 720 may be received (e.g., from server 120) and played by user device 110. Audio nickname tag 730 may provide an audible indication to the user of user device 110 that "John" has entered PTT chat session 710, and the user may not need to obtain such an indication from display 700. A second PTT contact 740 (e.g., Brian) may exit PTT chat session 710, and an audio nickname tag 750 associated with second PTT contact 740 may be received (e.g., from server 120) and played by user device 110. Audio nickname tag 750 may provide an audible indication to the user of user device 110 that "Brian" has exited PTT chat session 710, and the user may not need to obtain such an indication from display 700.

As further shown in FIG. 7, a third PTT contact 760 (e.g., Emma) may be listening to PTT chat session 710, and display 700 may provide an indication of Emma listening. However, an audio nickname tag for third PTT contact 760 need not be played until third PTT contact 760 exits or speaks during PTT chat session 710. A fourth PTT contact 770 (e.g., Paul) may be speaking in PTT chat session 710, and an audio nickname tag 780 associated with fourth PTT contact 770 may be received (e.g., from server 120) and played by user device 110 prior to fourth PTT contact 770 speaking. Audio nickname tag 780 may provide an audible indication to the user of user device 110 that "Paul" has the floor and is (or will be) speaking in PTT chat session 710, and the user may not need to obtain such an indication from display 700. A user 790 of user device 110 (e.g., me) may be listening to PTT chat session 710, and display 700 may provide an indication of user 790 listening.

As described above, the audio nickname tags depicted in FIG. 7 may be used to identify a PTT contact who has the floor (i.e., a user who is capable of speaking rather than listening) during PTT chat session 710. For example, if Brian (second PTT contact 740), Emma (third PTT contact 730), Paul (fourth PTT contact 770), and user 790 are involved in PTT chat session 710, Paul may have the floor and may be speaking about summer plans. John (first PTT contact 720) may enter PTT chat session 710, and John's audio nickname tag 730 may be received (e.g., from server 120) and played by user device 110 (e.g., announcing "John" has entered the chat session). Paul may immediately realize John has joined PTT chat session 710 based John's audio nickname tag 730, and may say "Hi John, how are things?" John may attempt to obtain the floor (e.g., by pressing the PTT key on his user device 110), but before he starts talking he may hear Emma's audio nickname tag provided by server 120 (e.g., announcing "Emma" is speaking) followed by Emma saying "Tell us about your trip John!" This may indicate that Emma obtained the floor before John's attempt to obtain the floor. John may again attempt to obtain the floor (e.g., by pressing the PTT key on his user device 110), and may hear audio nickname tag 730 provided by server 120 (e.g., announcing "John" is speaking). John and the others involved in PTT chat session 710 may realize that the floor has been obtained by John.

Such an arrangement may make it easier for parties in PTT chat session 710 to identify who is going to speak before the PTT contact with the floor actually speaks, and may ensure the PTT contact with the floor that he/she actually has the floor. Although not shown in FIG. 7, the above-identified functionality for PTT chat session 710 may also be used with a PTT group session in which a user of user device 110 may choose available PTT contacts for a PTT group discussion.

Although FIG. 7 shows an exemplary display of user device 110, in other implementations, user device 110 may provide fewer, different, or additional displays than depicted in FIG. 7. In still other implementations, the exemplary display of FIG. 7 may include fewer, different, or additional elements than depicted in FIG. 7.

Figure 8:
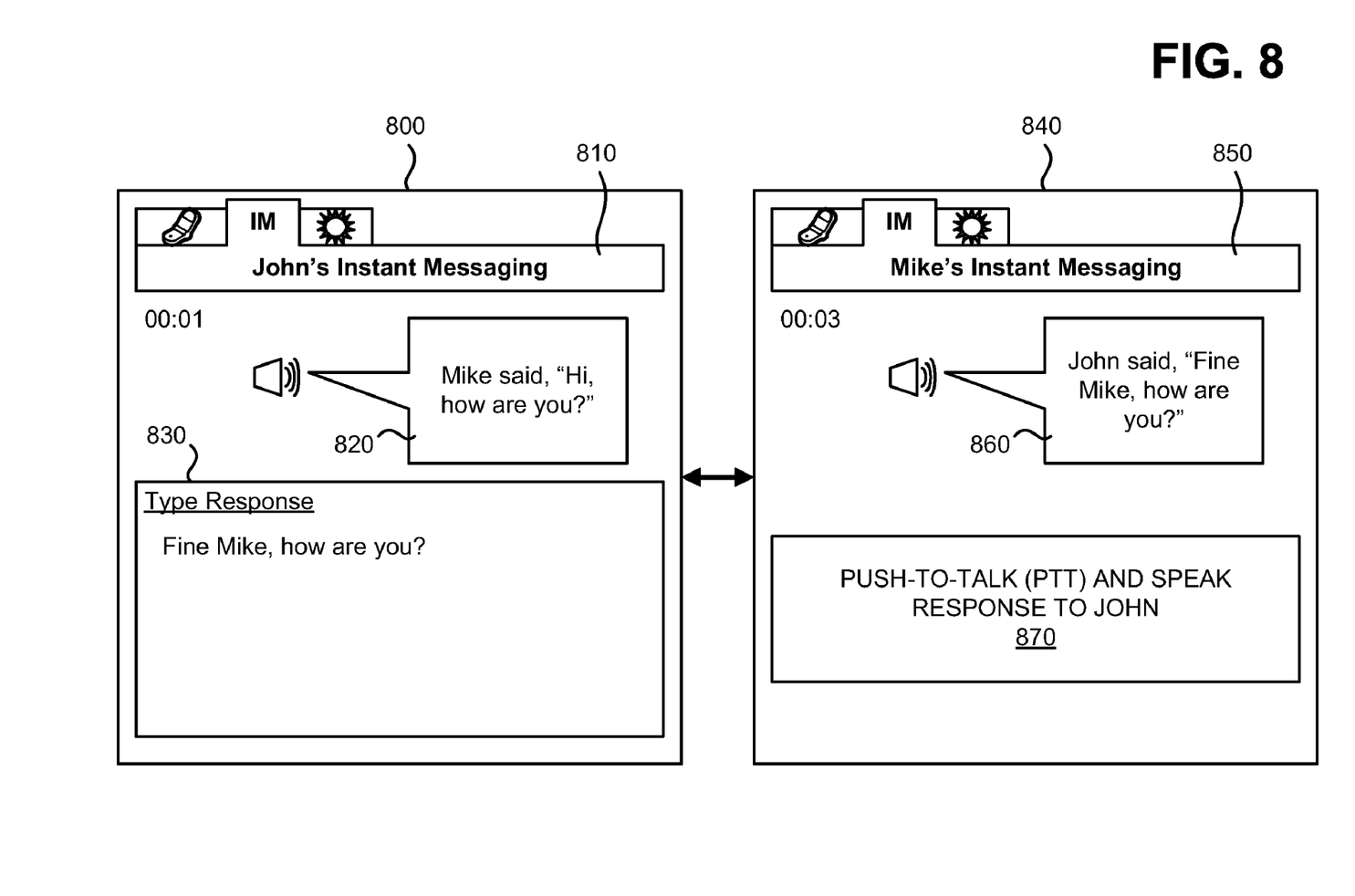
FIG. 8 is a diagram of exemplary displays of an instant messaging session that may be provided by two user devices of FIG. 1.

FIG. 8 is a diagram of exemplary displays of an instant messaging (IM) session that may be provided by two user devices 110 (e.g., via displays 230). As shown, a first user device 110 (e.g., John's user device 110) may provide a display 800 that includes an IM session 810. IM session 810 may provide a variety of information, such as IM information 820 received from a second user device 110 (e.g., Mike's user device 110), and a mechanism 830 (e.g., an input field) for inputting an instant message response (e.g., "Hi Mike, how are you?"). IM information 820 may include a textual and/or an audible instant message from the second user device 110. IM information 820 may be incorporated with an audio nickname tag associated with the other user device 110. For example, John's user device 110 may receive (e.g., from server 120) and play Mike's audio nickname tag (e.g., "Mike") and may play IM information 820 (e.g., "said, Hi, how are you?"). In one implementation, John's user device 110 may convert text-based IM information 820 into audio-based IM information 820 and vice-versa (e.g., via a text-to-speech converter application).

As further shown in FIG. 8, a second user device 110 (e.g., Mike's user device 110) may provide a display 840 that includes an IM session 850. IM session 850 may provide a variety of information, such as IM information 860 received from a first user device 110 (e.g., John's user device 110), and information 870 requesting Mike to select the PTT key of his user device 110 and speak a response to John. IM information 860 may include a textual and/or an audible instant message from another user device 110. IM information 860 may be incorporated with an audio nickname tag associated with the other user device 110. For example, Mike's user device 110 may receive (e.g., from server 120) and play John's audio nickname tag (e.g., "John") and may play IM information 860 (e.g., "said, Fine Mike, how are you?"). In one implementation, Mike's user device 110 may convert text-based IM information 860 into audio-based IM information 860 and vice-versa (e.g., via a text-to-speech converter application).

Although FIG. 8 shows exemplary displays of user device 110, in other implementations, user device 110 may provide fewer, different, or additional displays than depicted in FIG. 8. In still other implementations, the exemplary displays of FIG. 8 may include fewer, different, or additional elements than depicted in FIG. 8.

Exemplary Push-to-Talk Information Database

Figure 9:
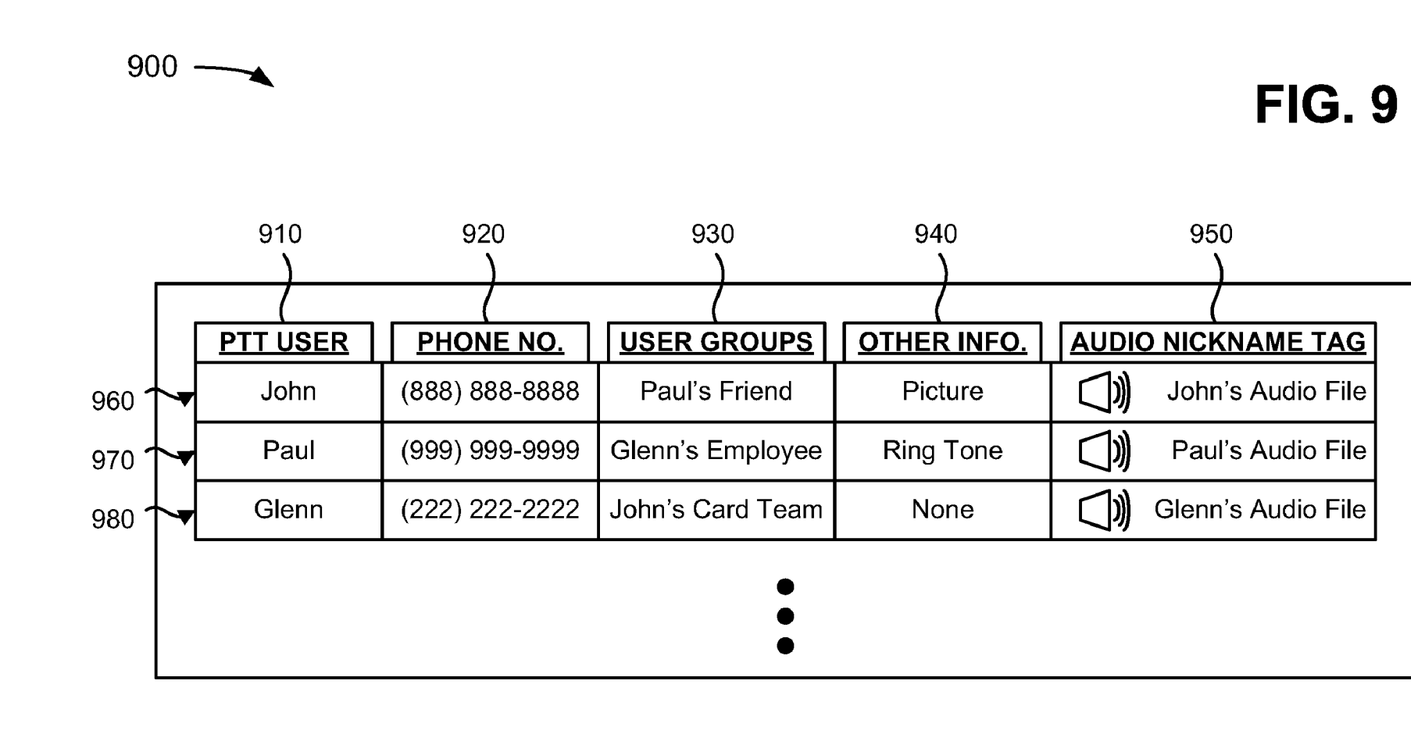
FIG. 9 depicts a diagram of a portion of an exemplary PTT information database capable of being provided in the server of FIG. 1.

FIG. 9 depicts a diagram of a portion of an exemplary PTT information database 900 capable of being provided in server 120 (e.g., within storage device 450) and/or managed by server 120. As shown, PTT information database 900 may include a variety of PTT user identifiers and/or PTT information categories, such as a PTT user category 910, a telephone number category 920, a user groups category 930, other information category 940, and an audio nickname tag category 950. Each PTT information category may include multiple PTT information-associated records. For example, as shown in FIG. 9, PTT information database 900 may include a first record 960, a second record 970, and third record 980. Although PTT information database 900 depicts three records, in other implementations, PTT information database 900 may include fewer, more, or different records than depicted in FIG. 9. Furthermore, PTT information database 900 may include fewer, different, or additional PTT information categories than depicted in FIG. 9. For example, in one implementation, a PTT user may not belong to a user groups category 930.

PTT user category 910 may include the names of PTT users. For example, first record 960 may include the name "John" under PTT user category 910, second record 970 may include the name "Paul" under PTT user category 910, and third record 980 may include the name "Glenn" under PTT user category 910. Telephone number category 920 may include the telephone numbers associated with the PTT user provided in PTT user category 910. For example, first record 960 may include the telephone number "(888) 888-8888" under telephone number category 920.

User groups category 930 may include the names of user groups associated with the PTT user provided in PTT user category 910. For example, first record 960 may include the user group name "Paul's Friend" under user groups category 930, second record 970 may include the user group name "Glenn's employee" under user groups category 930, and third record 980 may include the user group name "John's Card Team" under user groups category 930. Other information category 940 may include any other information (e.g., an address, a profile, a picture, a ring tone, etc.) associated with the PTT user provided in PTT user category 910. For example, first record 960 may include a picture of John under other information category 940.

Audio nickname tag category 950 may include the audio nickname tags associated with the PTT user provided in PTT user category 910. For example, first record 960 may include John's audio file under audio nickname tag category 950, second record 970 may include Paul's audio file under audio nickname tag category 950, and third record 980 may include Glenn's audio file under audio nickname tag category 950. The audio nickname tags provided in audio nickname tag category 950 may be provided from user devices 110 in the manner described above in connection with FIG. 5, and may be provided to user devices 110 in the manner described above in connection with FIGS. 6-9.

Exemplary Processes

Figure 10:
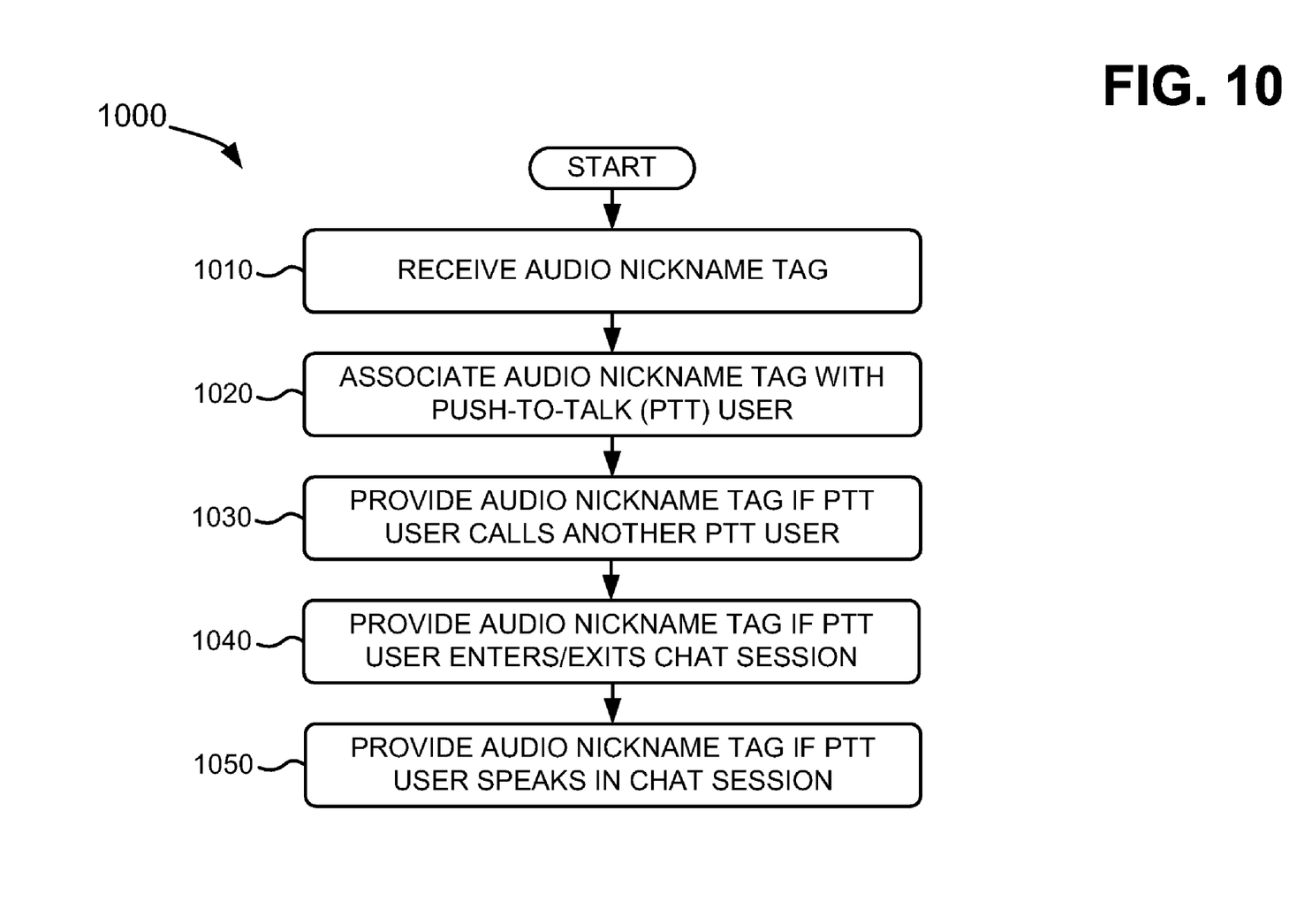
FIGS. 10 and 11 depict flow charts of exemplary processes according to implementations described herein.
Figure 11:
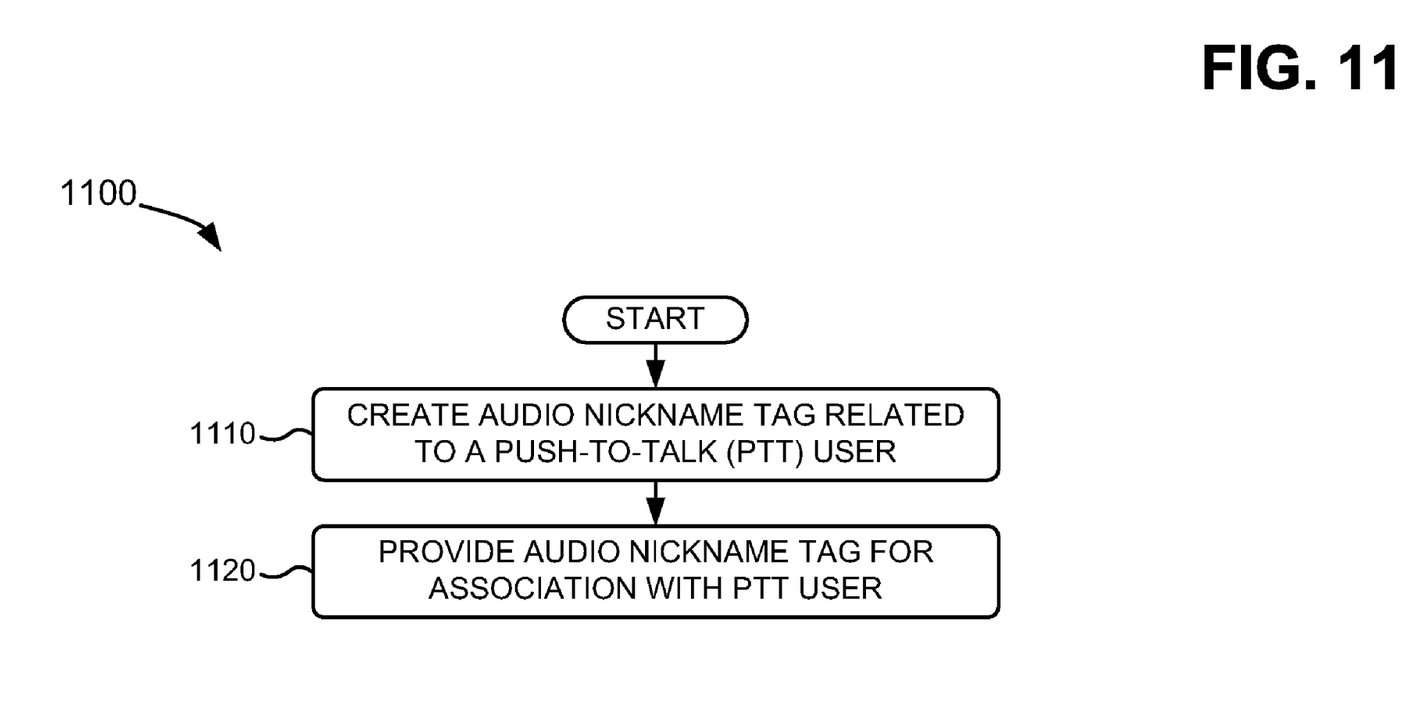

FIGS. 10 and 11 depict flow charts of exemplary processes according to implementations described herein. Generally, FIG. 10 depicts an exemplary audio nickname tag process 1000, and FIG. 11 depicts an exemplary process 1100 for creating an audio nickname tag. Processes 1000 and 1100 may be performed by hardware and/or software components on user device 110, server 120, or a combination of user device 110 and/or server 120. As shown in FIG. 10, process 1000 may begin with receipt of an audio nickname tag (block 1010). For example, in one implementation described above in connection with FIG. 5, user device 110 may provide a created audio nickname tag 550 and/or its associated information 560 to server 120 (e.g., via network 130, not shown).

The audio nickname tag may be associated with a push-to-talk (PTT) user (block 1020). For example, in one implementation described above in connection with FIGS. 5 and 9, server 120 may store audio nickname tag 550 and/or its associated information 560 in PTT information database 900. PTT information database 900 may include audio nickname tag category 950 which provides the audio nickname tags associated with the PTT users provided in PTT user category 910.

As further shown in FIG. 10, the audio nickname tag may be provided if the PTT user associated with the audio nickname tag calls another PTT user (block 1030). For example, in one implementation described above in connection with FIG. 5, if the user associates an audio nickname tag with a person sending the audio nickname tag, user device 110 may receive (e.g., from server 120) the audio nickname tag the next time the person attempts to call user device 110. In one example, if John calls user device 110 after providing his audio nickname tag, user device 110 may receive (e.g., from server 120) and play John's audio nickname tag and may indicate that a call is being received (e.g., user device 110, via speaker 220, may announce that "John is calling").

The audio nickname tag may be provided if the PTT user associated with the audio nickname tag enters and/or exits a group and/or a chat session (block 1040). For example, in one implementation described above in connection with FIG. 7, audio nickname tag 730 may be provided by server 120 and may provide an audible indication to the user of user device 110 that "John" has entered PTT chat session 710. Audio nickname tag 750 may be provided by server 120 and may provide an audible indication to the user of user device 110 that "Brian" has exited PTT chat session 710.

As further shown in FIG. 10, the audio nickname tag may be provided if the PTT user associated with the audio nickname tag speaks in the group and/or chat session (block 1050). For example, in one implementation described above in connection with FIG. 7, fourth PTT contact 770 (e.g., Paul) may be speaking in PTT chat session 710, and audio nickname tag 780 associated with fourth PTT contact 770 may be provided to (e.g., by server 120) and played by user device 110 prior to fourth PTT contact 770 speaking. Audio nickname tag 780 may provide an audible indication to the user of user device 110 that "Paul" has the floor and is (or will be) speaking in PTT chat session 710.

FIG. 11 depicts an exemplary process 1100 for creating an audio nickname tag. As shown in FIG. 11, process 1100 may begin with creation of an audio nickname tag related to a push-to-talk (PTT) user (block 1110). For example, in one implementation described above in connection with FIG. 5, if person 530 wishes to input his/her name or other information as the audio nickname tag, person 530 may select a PTT key of user device 110 (e.g., one of control buttons 240), and may speak name 540 (e.g., "Joe") into microphone 260 of user device 110.

The audio nickname tag may be provided (e.g., to a database) for association with the PTT user (block 1120). For example, in one implementation described above in connection with FIGS. 5 and 9, user device 110 may provide a created audio nickname tag and/or its associated information to server 120 (e.g., via network 130, not shown) as indicated by reference numbers 550 and 560, respectively. Server 120 may store audio nickname tag 550 and/or its associated information 560 in PTT information database 900. PTT information database 900 may include audio nickname tag category 950 which provides the audio nickname tags associated with the PTT users provided in PTT user category 910.

CONCLUSION

Implementations described herein may provide an audio nickname tag for a user of a PTT user device. For example, in one implementation, the user device may correspond to a cellular or mobile telephone capable of supporting PTT functionality. The user device may permit the PTT user to record one or more audio nickname tags and/or to associate other PTT users with audio nickname tags. In one example, the audio nickname tags may be used to inform parties in a PTT group session or chat session when a user(s) associated with the audio nickname tags enters and/or exits the session. In another example, the audio nickname tags may be used to identify a PTT user who has the floor during a PTT group or chat session. This may make it easier for parties in the PTT group or chat session to identify who is going to speak before the PTT user with the floor actually speaks, and may ensure the PTT user with the floor that he/she actually has the floor. In still other examples, the audio nickname tags may be used to identify a user sending instant messages, text messages, and/or emails to another user, and/or calling another user.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 10 and 11, the order of the acts may be modified in other implementations. Further, non-dependent acts may be performed in parallel.

Also, the term "user" has been used herein. The term "user" is intended to be broadly interpreted to include a user device or a user of a user device.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method, comprising:
   receiving an audio nickname tag related to a push-to-talk (PTT) user; and
   associating the audio nickname tag with the PTT user; and
   providing the audio nickname tag to a user device when:
   the PTT user one of enters or exits a PTT group or chat session,
   when the PTT user has the floor in one of the PTT group or chat session, and at least one of:
   when the PTT user speaks during the PTT group or chat session, or
   when the PTT user calls the user device.

2. The method of claim 1, where the audio nickname tag uniquely identifies the PTT user.

3. The method of claim 1, where the receiving the audio nickname tag comprises:
   receiving selection of at least one of a plurality of pre-created audio nickname tags,
   where the plurality of pre-created audio nickname tags comprises one or more common names of people.

4. The method of claim 1, further comprising:
   receiving at least one upload of a plurality of audio files; and
   associating at least one of the plurality of audio files, as at least one other audio nickname tag, with the PTT user.

5. A method, comprising:
   creating an audio nickname tag related to a push-to-talk (PTT) user, where creating the audio nickname tag comprises:
  receiving a text input from the PTT user,
  converting the text input into an audio input, and
  storing the audio input as the audio nickname tag; and
providing the audio nickname tag to a database for association with the PTT user; and
providing the audio nickname, associated with the PTT user, to a user device when the PTT user communicates with the user device.

6. The method of claim 5, further comprising:
receiving an audio input from the PTT user; and
storing the audio input as another audio nickname tag.

7. The method of claim 5, further comprising:
receiving an upload of an audio file; and
associating the received of audio file, as another audio nickname tag, with the PTT user.

8. A device, comprising:
a memory to store a plurality of instructions; and
a processor to execute instructions in the memory to:
  receive an audio nickname tag related to a push-to-talk (PTT) user,
    where the audio nickname tag comprises at least one of an audio file, streaming audio, a combination of audio files, or one or more audio files with embedded links to other files,
  associate the audio nickname tag with the PTT user, and
  store the audio nickname tag, and
  provide the stored audio nickname tag to a user device when:
    the PTT user one of enters or exits a PTT group or chat session, and
    when the PTT user speaks during the PTT group or chat session.

9. The device of claim 8, where the processor further executes instructions to:
provide the audio nickname tag to a user device if the PTT user calls the user device.

10. The device of claim 8, where the processor further executes instructions to:
provide the audio nickname tag to a user device to indicate that the PTT user has the floor in one of the PTT group or chat session.

11. The device of claim 8, where the memory comprises a PTT information database that includes a plurality of PTT user identifiers and a plurality of audio nickname tags associated with the plurality of PTT user identifiers.

12. The device of claim 8, where the audio nickname tag provides a unique audible identifier for the associated PTT user.

13. A device, comprising:
a memory to store a plurality of instructions; and
processing logic to execute instructions in the memory to:
  create an audio nickname tag related to a push-to-talk (PTT) user,
    where, when creating the audio nickname tag, the processing logic is further to execute the instructions to:
      receive an audio input from the PTT user; and
      store the audio input as the audio nickname tag,
  provide the audio nickname tag to a database for association with the PTT user, and
  play the audio nickname tag when the PTT user communicates with the device.

14. The device of claim 13, where the processing logic further executes instructions to:
receive a text input from the PTT user;
convert the text input into an audio input; and
store the audio input as another audio nickname tag.

15. A device, comprising:
a memory to store a plurality of instructions; and
processing logic to execute instructions in the memory to:
  receive an audio nickname tag related to a push-to-talk (PTT) user,
    where the audio nickname tag comprises at least one of an audio file, streaming audio, a combination of audio files, or one or more audio files with embedded links to other files,
  associate the audio nickname tag with contact information related to the PTT user, and
  play the audio nickname tag if the PTT user communicates with the device via a communication mechanism associated with the contact information.

16. The device of claim 15, where the processing logic further executes instructions to:
play the audio nickname tag if the user communicates with the device via one of a telephone call, a text message, an instant message, or an email.

17. A system, comprising:
means for receiving an audio nickname tag related to a push-to-talk (PTT) user;
means for associating the audio nickname tag with the PTT user; and
means for providing the audio nickname tag when the PTT user performs a PTT function,
where the PTT function comprises:
  when the PTT user generates a PTT call, and at least one of
  when the PTT user enters or exits a PTT group or chat session, or
  the PTT user speaks during the PTT group or chat session.

18. The system of claim 17, where the means for receiving the audio nickname tag related to the PTT user comprises:
means for receiving selection of at least one of a plurality of pre-created audio nickname tags.

19. A system, comprising:
means for creating an audio nickname tag related to a push-to-talk (PTT) user; and
means for providing the audio nickname tag to a database for association with the PTT user; and
means for providing the audio nickname tag when the PTT user communicates with a user device,
where the audio nickname tag comprises an audio file, streaming audio, and at least one of a combination of audio files, or one or more audio files with embedded links to other files.

20. The system of claim 19, where the means for providing the audio nickname tag when the PTT user communicates with a user device comprises:
means for playing the audio nickname tag when the PTT user communicates with the user device via at least one of a telephone call, a text message, an instant message, or an email.

* * * * *